J. R. WHEELER.
BEE-HIVE.

No. 188,452. Patented March 13, 1877.

UNITED STATES PATENT OFFICE.

JOHN R. WHEELER, OF WARREN TOWNSHIP, POWESHIEK COUNTY, IOWA.

IMPROVEMENT IN BEE-HIVES.

Specification forming part of Letters Patent No. 188,452, dated March 13, 1877; application filed September 8, 1876.

*To all whom it may concern:*

Be it known that I, JOHN R. WHEELER, of Warren township, in the county of Poweshiek, and State of Iowa, have invented certain new and useful Improvements in Bee-Hives; and I do hereby declare that the following is a full, clear, and exact description thereof, which will enable others skilled in the art to which it appertains to make and use the same, reference being had to the accompanying drawings, which form a part of this specification, and in which—

Figure 1:
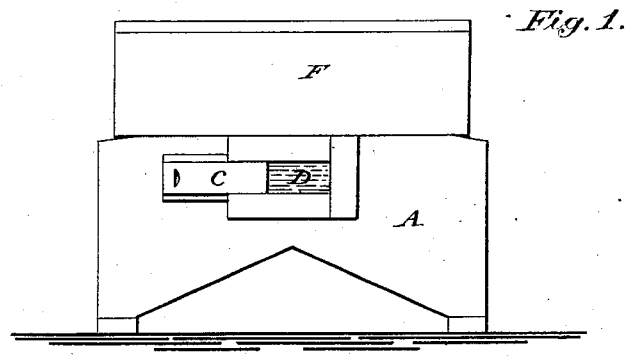
Figure 2:
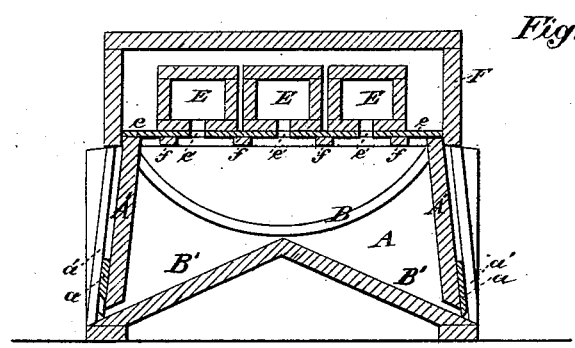
Figure 3:
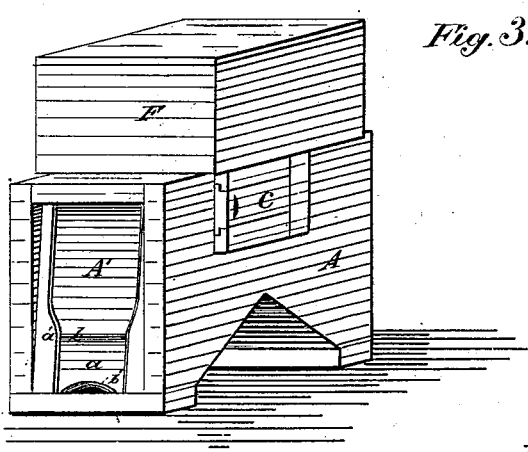

Figure 1 is a side elevation. Fig. 2 is a longitudinal vertical section; and Fig. 3 is a perspective front view.

This invention relates to that class of bee-hives that consist of a comb-box having one or more separate and detachable honey-boxes superimposed; and it consists in an improved construction and arrangement of the hive or comb box, substantially as hereinafter more fully described.

In the drawing, A is the hive or comb box proper, which consists of a square box, having side pieces A, and end pieces A'. The former are of the configuration shown in the drawing—that is, a triangular piece is cut out in the lower end, so as to form a bottom slanting toward both ends. The end pieces A' slant inwardly, the side pieces A projecting beyond them, so as to form recesses in which are placed the guide-bars a', consisting of pieces of wood nailed onto the ends A', and having vertical grooves in which slide the reversible doors a. Within the hive A is placed one or more bent rods or bows, B, abutting against the ridge or highest portion of the slanting floor, and reaching up on each side to the top of end pieces A', below the removable honey-boxes. The slanting end pieces A' aid in keeping this bow in position. $ff$ are slats of wood resting upon a gasket or shoulder in the upper rim of the hive, below the honey-boxes. These slats form, together with the bow or bows B, the frame in which the comb is built by the bees, the shape of each comb thus being triangular, and sufficient space being left between the several combs to permit the bees to work freely. C is a slide covering a glass pane, D, in the side or sides of the box, through which the working of the bees may be observed. E E are the honey-boxes, which are placed upon a cover, e, having perforations e' above the hive A, and slats f, these latter being arranged directly under the solid portions of cover e, so that the bees may pass freely through the perforations or slots in cover e; and F is the removable cover for the honey-boxes, to protect them from cold and wet.

The doors a (there is one of these doors at each end) consist of pieces of wood or metal, which slide in the grooves in the guide-pieces a', and have one straight edge, b, and one recessed or cut-out edge, b', the latter forming the opening into the hive. By reversing this door, or turning the straight edge downward, the entrance to the hive is closed.

The advantages of the inclined or slanting bottom are, first, that it causes a draft of air to pass below the floor of the hive, thereby keeping this dry, and keeping off the frost in winter; second, it allows the bees to work with equal facility at both ends of the hive; and, thirdly, no worms or moth can stay in the hive, which is self-cleaning, as the bees that die in winter, as well as broken pieces of comb and other impurities, will roll down the inclined floor and fall out. In winter there will always be a draft of fresh air passing through the hive from one end to the other, while the bent bow serves to steady the combs, the upper edges of which are secured upon the racks or slats $ff$, so that they are not apt to break by moving the hive from place to place.

Having thus described my invention, I claim and desire to secure by Letters Patent of the United States—

1. In a bee-hive, the combination of the bow or bows B, and slats $ff$, substantially as and for the purpose shown and specified.

2. In a bee-hive, having the bow or bows B, and slats $ff$, the double-inclined floor B' B', slanting toward the entrances, substantially as and for the purpose shown and specified.

In testimony that I claim the foregoing as my own I have hereto affixed my signature in presence of two witnesses.

JOHN R. WHEELER.

Witnesses:
 A. CONNER,
 A. C. WILSON.